(No Model.) 2 Sheets—Sheet 1.

S. W. WARDWELL, Jr.
CLUTCH AND STOP DEVICE.

No. 262,159. Patented Aug. 1, 1882.

Attest:
Courtney A. Cooper
William Paxton

Inventor:
S. W. Wardwell Jr
By his attorney
Charles E. Foster (No Model.) 2 Sheets—Sheet 2.

S. W. WARDWELL, Jr.
CLUTCH AND STOP DEVICE.

No. 262,159. Patented Aug. 1, 1882.

UNITED STATES PATENT OFFICE.

SIMON W. WARDWELL, JR., OF WOONSOCKET, RHODE ISLAND.

CLUTCH AND STOP DEVICE.

SPECIFICATION forming part of Letters Patent No. 262,159, dated August 1, 1882.

Application filed February 23, 1882. (No model.)

*To all whom it may concern:*

Be it known that I, SIMON W. WARDWELL, Jr., of Woonsocket, Providence county, Rhode Island, have invented an Improvement in Clutch and Stop Devices, of which the following is a specification.

My invention is a clutch and stop device adapted especially to such machines as must be run with great rapidity, but arrested instantly when necessary; and the objects of my invention are to arrest the machine at once, yet with little or no shock to the mechanism, to readily start the machine, and in some instances to insure the stoppage of the machine only when its parts are set in predetermined positions.

Figure 1:
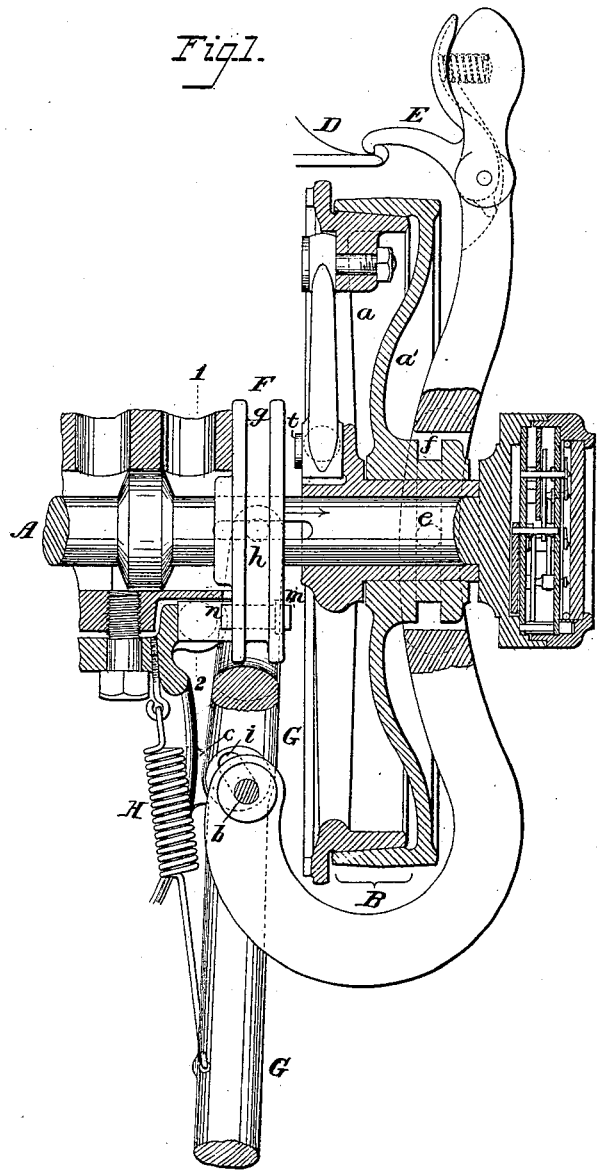
Figure 2:
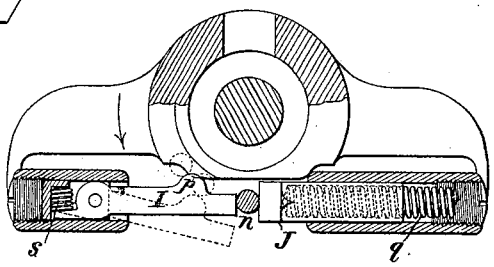
Figure 3:
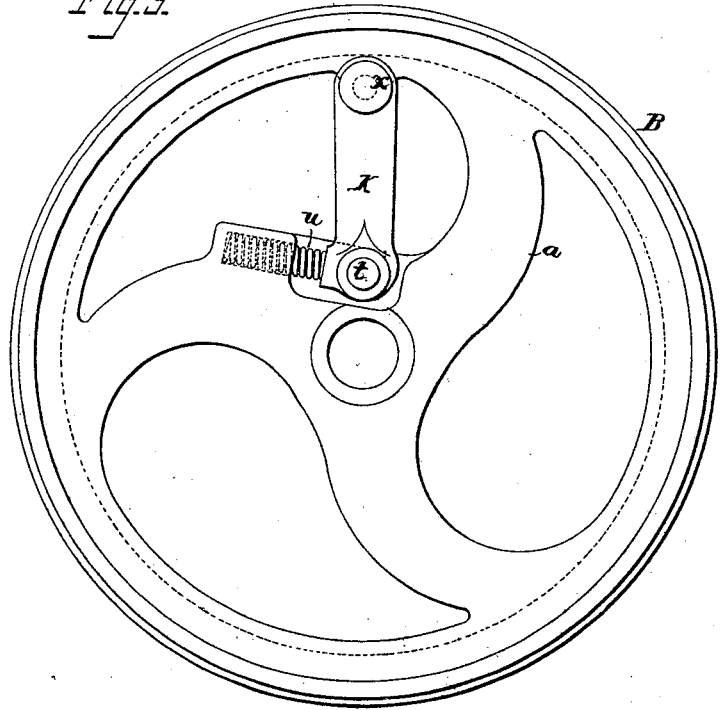

In the drawings forming part of this specification, Figure 1 is a longitudinal section, showing the shaft of a machine with my improved clutch and stop devices connected therewith. Fig. 2 is a transverse section on the line 1 2, Fig. 1. Fig. 3 is a detached inner face view of the pulley.

A is the driving-shaft of any machine to which it may be desirable to apply the invention—as, for instance, a pegging-machine, sewing-machine, slatter, &c.

B is the driving-pulley, which may consist of two sections, $a$ $a'$, the former revolving on the shaft and the latter sliding on the shaft or on the hub of the section $a$, the sections having corresponding beveled friction-faces, which are brought together or separated by the action of the clutch-lever C. This permits the section $a'$ to be revolved alone to drive a bobbin-winder or other device.

The lever C is bent at the lower end to extend from the outside round the edge of the pulley to its fulcrum-pin $b$, extending through ears $c$, projecting from the frame of the machine, and the shaft of the lever is extended across the face of the pulley, with a swell corresponding to the sunken face of the pulley, and with a central yoke adapted to receive the end of the shaft and hub, so that the lever projects but little beyond the outline of the machine proper.

Studs $e$ (dotted lines, Fig. 1) extend from the sides of the lever-yoke into an annular groove, $f$, in the hub of the section $a'$, which is thus connected to the lever-hub, can rotate freely, and the handle of the lever is provided with a spring-catch, E, adapted to catch upon a shoulder on some portion of the frame D of the machine. The belt runs on the face of the section $a'$, and when the latter is removed from the section $a$ the driving action upon the machine ceases.

To the shaft A is secured, so as to slide thereon, but turn therewith, a disk, F, having a peripheral groove, $g$, adapted to receive studs $n$ (dotted lines, Fig. 1) on the forked end of a lever, G, sliding and vibrating on the pin $b$, which extends through an inclined slot, $i$, in the lever.

A spring, H, tends to elevate the lever, the depression of which, in consequence of the angle of the slot $i$, throws it outward and carries the disk F on the shaft A in the direction of the arrow; and a treadle may be connected to the lever to depress it.

From one side of the disk F projects a stud, $m$, and from the other a stud, $n$; or both may be the ends of one pin.

To the frame of the machine is pivoted a lever, L, Fig. 2, having on the upper edge a rounded lug, $p$, and on the outer short arm of the lever bears a spring, $s$, tending to maintain the lever horizontal, in which position the lug $p$ is in the circular path traveled by the stud $n$, but will only be struck by the latter when the disk F is in the position shown in Fig. 1—that is, back near the frame of the machine.

To a socket in the frame of the machine, in line with the lever I, is fitted a hollow bar, J, which is thrown toward the lever I by a spring, $q$.

When the machine is at work the lever G is depressed by the pressure of the operator's foot upon the treadle or otherwise, and the disk F is in a position near the wheel B; but when the machine is to be arrested the lever is released, the spring H draws it upward, the disk F is moved inward toward the frame, and the stud $n$ strikes the lug $p$ and depresses the lever I against the action of the spring $s$, which tends somewhat to retard the movement of the stud, its disk, and shaft, but without arresting the same. The motion is continued until the stud $n$ passes from the lever I and strikes the end of the bar J, which will be driven inward until the spring $q$ is compressed sufficiently to resist the further movement. The spring then forces the bar again outward until the stud $n$ is brought against the end of the lever I, which assumed a horizontal position when the stud passed from contact therewith.

The movement of the machine is thus quickly arrested, not abruptly, however, as the speed is graduaally retarded, first, by the resistance of the spring-lever I, and, second, by that of the spring $q$.

It will be seen that although the lever I yields under the impulse it springs back to afford an unyielding abutment, against which the stud is clamped by the bar J, so that the machine is invariably stopped with the parts in the same position, which is important in some classes of machines—as, for instance, sewing-machines, where it is necessary that the needle shall be out of the fabric when the motion is arrested.

It will be evident that other means may be used for sliding the disk F upon the shaft, and that in some cases the shaft itself, or the stud $n$, carried by the disk, may be moved longitudinally with the same effect.

When the machine is to be started the lever G is depressed to throw the disk F outward and carry the stud $n$ from between the lever I and bar J, when the stud $m$ will be struck by a projection, $t$, on the slide of the revolving pulley B, and the disk and shaft will be carried with the pulley as long as the studs are in contact.

To prevent the shock resulting from the sudden contact of the lugs $m\ t$, either one or both may be secured to a block or arm having a spring-bearing which will yield slightly on the first impact. For instance, the stud $t$ may be carried by the arm K, pivoted by a pin, $x$, to a wheel, B, and a spring, $u$, may be placed between the arm and a bearing upon the wheel, as shown in Fig. 3.

I claim—

1. The combination, with the wheel B, consisting of the sections $a\ a'$, of the lever C, carrying studs $e$, adapted to a groove, $f$, in the hub of the section $a'$, and bent inward to conform to the face of said section, substantially as set forth.

2. The combination of the shaft A, disk F, provided with a stud, $n$, spring-lever L, and spring-bar J, carried by the frame and arranged to be struck by the stud when the latter is carried inward, substantially as set forth.

3. The combination of the shaft A, disk F, stud $n$, devices for changing the longitudinal position of the stud, and a spring-bar, J, arranged to be struck by the stud when the latter is carried inward, substantially as set forth.

4. The combination of a driving-shaft, a wheel carrying a stud, $n$, a spring-lever arranged to be depressed by the stud and to spring back into the path thereof, a spring-bar arranged to be struck by the stud after it passes the lever, and appliances for moving the stud into and out of line with the lever and bar, all substantially as set forth.

5. The combination of the shaft A, wheel B, carrying a stud, $t$, disk F, carrying a stud, $m$, adjustable in respect to the wheel B, and spring-bearing for one or both of the studs, substantially as set forth.

6. The combination, with the driving-shaft of a machine, of a movable stud, $n$, and bearings arranged to be struck by said stud when the same is carried to one side, and to clamp the latter in a predetermined position, as specified.

In testimony whereof I have signed my name to this specification in the presence of two subscribing witnesses.

SIMON W. WARDWELL, Jr.

Witnesses:
EDWIN J. PEIRCE, Jr.,
FRED H. BISHOP.